DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUG. 1, 1972

901 O.G. 9

---

T901,016
PHOTOCONDUCTIVE COMPOSITIONS AND ELEMENTS

Rein Virkhaus, % Eastman Kodak Co., Kodak Park Division, 1669 Lake Ave., Rochester, N.Y. 14650

Filed Dec. 20, 1971, Ser. No. 210,129
**Int. Cl. G03g *5/06***
U.S. Cl. 96—1.5
No Drawing. 21 Pages Specification

Photoconductive ylid compounds having the formula:

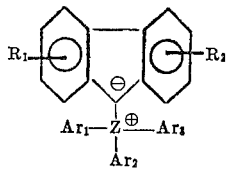

wherein $R_1$ and $R_2$ are each an alkyl radical, an alkoxy radical, an aryl radical, a cyano radical, a halogen atom or a hydrogen atom; $Ar_1$, $Ar_2$ and $Ar_3$ are each aryl radicals; and Z is a Group V*a* element, are useful in electrographic elements. Useful elements are comprised of a conductive support having thereon a layer of a photoconductive composition comprised of an electrically insulating, film-forming organic binder and an ylid compound of the above formula.